Oct. 8, 1957  E. G. HILL ET AL  2,808,704
BOOSTER BRAKE MECHANISM
Filed April 9, 1953  8 Sheets-Sheet 1

INVENTORS
EDWARD GOVAN HILL
DAVID T. AYERS, JR.
BY John F. Phillips
ATTORNEY

INVENTORS
EDWARD GOVAN HILL
DAVID T. AYERS JR.

BY John V. Phillips
ATTORNEY

Oct. 8, 1957 E. G. HILL ET AL 2,808,704
BOOSTER BRAKE MECHANISM
Filed April 9, 1953 8 Sheets-Sheet 8

INVENTORS
EDWARD GOVAN HILL
DAVID T. AYERS JR.,
BY John F. Phillips
ATTORNEY

United States Patent Office 2,808,704
Patented Oct. 8, 1957

2,808,704

BOOSTER BRAKE MECHANISM

Edward Govan Hill and David T. Ayers, Jr., Birmingham, Mich., assignors to Kelsey-Hayes Company, a corporation of Delaware Application April 9, 1953, Serial No. 347,700

24 Claims. (Cl. 60—54.6)

This invention relates to a booster brake mechanism for motor vehicles.

Power brake mechanisms have been relatively highly developed in recent years and they fall generally into two classes, both of which involve disadvantages. One general type of booster brake mechanism in common use employs a brake pedal connected to a conventional hydraulic master cylinder the outlet of which is piped to a booster mechanism embodying a motor and another master cylinder connected to the wheel cylinders, the booster motor being energized by fluid displaced from the conventional master cylinder. This type of mechanism is advantageous in one respect in that the booster mechanism can be placed wherever space is available since it is connected to the wheel cylinders and to the conventional master cylinder solely by fluid lines.

The type of booster mechanism referred to, while possessing installation advantages, is relatively expensive to manufacture and install, as is well known. The second type of power brake mechanism in common use reduces such disadvantages by combining the booster mechanism directly with the brake pedal and with a single master cylinder so that action of the brake pedal energizes the booster motor to displace hydraulic fluid from the single master cylinder, under pressure, to the wheel cylinders. Such a mechanism may be manufactured and installed at a lower cost but is disadvantageous for the reason that it requires more space than a conventional master cylinder. Such space beneath the toe board and floor board of the vehicle is not always available for the installation of this type of booster mechanism, and this problem is increasing with modern vehicles since less and less space is becoming available for booster brake installations, thus frequently requiring the use of the first type of booster mechanism referred to.

An important object of the present invention is to provide a novel type of booster brake mechanism which requires a minimum amount of space for installation on a motor vehicle and which is economical to manufacture and easy to install.

More specifically, an object of the invention is to provide such a mechanism wherein the booster motor is largely arranged above and rearwardly of the toe board of the vehicle, thus minimizing the space required beneath the toe board and rendering the device capable of installation on any motor vehicle.

A further object is to provide such a mechanism wherein the steel toe boards of motor vehicles are stamped to provide openings for the mounting of the present construction and wherein such openings, if a vehicle is not to be equipped with a booster brake mechanism, readily can be closed by a flat metal closure plate.

A further object is to provide a booster brake mechanism wherein the fluid pressure motor for generating hydraulic pressures comprises a pair of walls, one of which is stationary and forms in effect a part of the vehicle toe board and the other of which projects above and rearwardly of the toe board to be positioned adjacent and substantially parallel to the brake treadle to be covered thereby and to be operated by such treadle in the event of a failure of power in the fluid pressure operated motor.

A further object is to provide such a booster mechanism wherein the movable wall of the booster motor is directly subject to atmospheric pressure within the driver's compartment upon the exhausting of air from the interior of the motor, and wherein the movable wall is pivoted to turn about an axis coincidental with the pivot axis of the brake operating treadle to move slightly in advance of such treadle when the latter is operated by the foot, and to be directly actuated by the treadle in the event of a failure of power in the booster motor.

A further object is to provide a power booster mechanism of the type referred to which forms a combination with the toe board of the vehicle in a novel manner both from the standpoint of operation and installation, the entire booster unit including the motor, the hydraulic pressure generating means, and the valve mechanism for energizing the motor being assembled as a single unit readily installable with respect to the toe board by being mounted in an opening cut therethrough and directly secured to the toe board.

Other objects and advantages of the invention will become apparent during the course of the following description.

In the drawing we have shown several embodiments of the invention. In this showing.

Figures 1, 2:
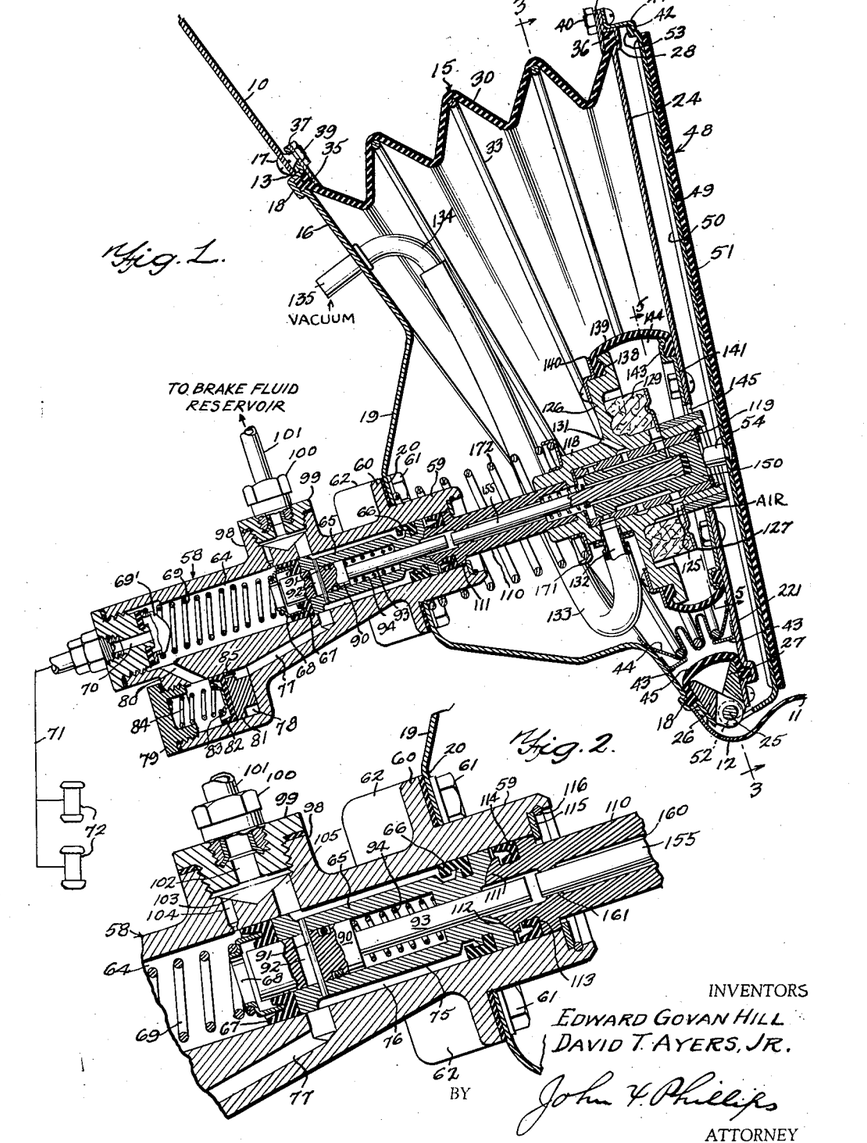
Figure 1 is a sectional view taken axially through the pressure generating means and the valve mechanism therefor, showing the motor in section, with the unit mounted in position with respect to the toe board and floor board of a vehicle.
Figure 2 is an enlarged fragmentary axial sectional view through the hydraulic fluid pressure generating means and associated elements.

Referring to Figure 1, the numeral 10 designates the inclined conventional toe board of a motor vehicle joined at its lower rear end with the usual floor board 11. In the present instance, the sheet steel adjacent the junction of the toe board and floor board is depressed downwardly to form an elongated pocket 12 (Figure 3) for a purpose to be described. The toe board 10 is stamped to provide an opening 13 for the mounting of a unit constructed in accordance with the present invention, as further described below. This opening is preferably rectangular and may be covered with a flat steel plate secured in position relative to the toe board if a booster unit is not to be used with the vehicle.

The present invention comprises a motor indicated as a whole by the numeral 15. This motor comprises a rear plate 16 fixed around its edges to the toe board 11 adjacent the periphery of the opening 13 by means of suitable bolts 17. The motor wall 16 is stamped to provide a peripheral recess 18 which fits within the opening 13 to assist in positioning the wall 16 relative to the toe board. In other words, the outer profile of the rib forming the recess 18 coincides with the shape and size of the opening 13 to fit therein, which will be apparent in Figure 1. The wall 16 is provided intermediate its upper and lower edges and between its side edges with a forwardly and downwardly stamped portion 19 provided in its bottom with a flat wall portion 20 to which is secured the master cylinder unit as further described below.

The motor 15 further comprises a forward wall 24 which forms the pressure movable wall of the motor. Both of the walls 16 and 24 may be formed of flat steel. A hinge pin 25 passes through ears 26 and 27 fixed respectively to the lower edge portions of the walls 16 and 24 and, accordingly, the wall 24 turns on the axis of the pin 25. The wall 24 is provided with a peripheral bead 28 to form a recess corresponding to the recess 18 for a purpose to be described.

Figure 3:
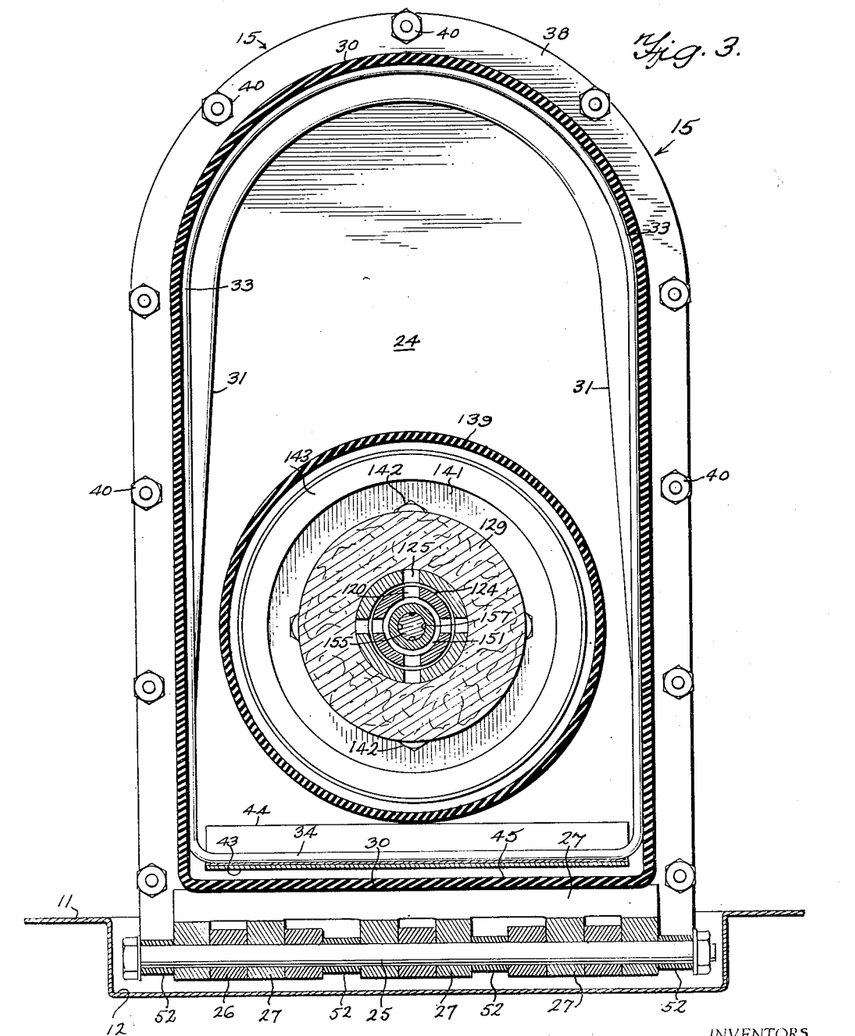
Figure 3 is an enlarged sectional view taken substantially on line 3—3 of Figure 1.

Most motors comprise casings having pressure movable elements therein in the form of a piston or diaphragm. The pressure movable element of the present motor is the wall 24, and this wall is connected to the wall 16 by a bellows 30, the folds of which are relatively deep at the top of the motor and taper to decrease in width, as at 31 (Figure 3), toward the pivoted end of the motor. Within each outwardly extending fold of the bellows is arranged a form-retaining element 33, each of these elements being in the form of a continuous steel rod corresponding generally in shape to the bellows to substantially fit therein, as shown in Figure 3, except that the bottom 34 of each element 33 is spaced above the bottom of the bellows, as shown in Figure 3. Opposite extremities of the bellows are provided with beads 35 and 36 fitting respectively in the recesses 18 and 28. The beaded portions of the bellows are retained in position by a pair of flat plate members 37 and 38 fixed respectively as at 39 and 40 to peripheral flange portions formed on the walls 16 and 24 outwardly of the recesses 18 and 28. The upper fastening element 40 also secures in position relative to the wall 24 a bracket 41 having a depending finger 42 for a purpose to be described.

In the present instance, the walls 16 and 24 are shown near the bottoms thereof as being provided with bracket elements 43 fixed to the respective motor walls, preferably by welding, and these bracket elements support a clip 44 having folds receiving the bottom bars 34 of the elements 33. Such means may be employed for supporting the bottoms of the form-retaining element 33 out of contact with the lower and narrowest wall 45 of the bellows.

Associated with and arranged adjacent the wall 24 is a treadle indicated as a whole by the numeral 48 and comprising a steel treadle plate 49, preferably having reinforcing ribs 50 and covered with a rubber or similar facing sheet 51. The treadle plate 49 is bent inwardly at its lower end and terminates in spaced circular ends 52 (Figure 3) turned about the rod 25 for pivotally supporting the treadle for turning movement on the same axis as the motor wall 24. At its upper end, the plate 49 is provided with an inwardly offset lip 53 engaging behind the lip 42 to limit outward movement of the treadle relative to the motor wall 24 while permitting limited inward movement of the treadle relative to the wall 24, for a purpose which will become apparent. A valve operating button 54 is carried by the treadle plate 49 to operate the valve mechanism referred to below.

Outwardly of the wall 16 of the motor is arranged a master cylinder indicated as a whole by the numeral 58 and formed as a casting having an inner end 59 projecting through an opening in the wall portion 20, the master cylinder casting being flanged as at 60 to seat against the flat wall 20 and being fixed thereto by screws 61 extending into bosses 62 cast integral with the master cylinder casting.

This casting is provided with an internal cylinder 64 in which is slidable the plunger sleeve 65, power operated in a manner to be described and provided with a seal 66 at one end and having its other end engaged with the base of a double lipped seal 67. This seal is engaged by a spring seat 68, and a coiled spring 69 has one end engaging this seat and its other end engaged with a conventional residual pressure valve 69', controlling the flow of hydraulic fluid from the master cylinder back and forth through an opening 70. This opening communicates with fluid line 71 leading to the wheel cylinders 72, two of which are diagrammatically illustrated in Figure 1.

Intermediate its ends the plunger sleeve 65 is reduced in diameter as at 75 to provide a chamber 76 communicating in all positions of the plunger sleeve 65 with a passage 77 leading to one end of a cylinder 78 the other end of which is closed by a plug 79, and the latter end of the cylinder 78 communicates through a passage 80 with the cylinder 64 adjacent the outlet end thereof. A plunger 81 slides in the cylinder 78 and is provided with a flexible lipped cup 82 having a seat 83 the peripheral portion of which is spaced from the cup 82 and is engaged by one end of a spring 84 the other end of which seats against the plug 79. A small passage 85 through the plunger 81 permits the flow of hydraulic fluid from passage 77 around the lip of cup 82 under conditions to be referred to. As will be explained, the device comprising the plunger 81 and associated elements prevents the generation of sub-atmospheric pressure in the cylinder 64 upon a sudden retractile movement of the plunger sleeve 65 and the elements associated therewith.

A plunger 90 slides in the sleeve 65 and the latter carries a cross pin 91 slidable through a slot 92 in the plunger 90 to provide for independent movement of the sleeve 65 and plunger 90. The left-hand end of the plunger 99 sides through the inner lip of cup 67, and the plunger is provided at its other end with an axially extending stem 93 slidable in the reduced adjacent end of the sleeve 65. A spring 94 surrounding the stem 93 urges the plunger 90 to its normal position shown in Figure 1.

Means are provided for supplying hydraulic fluid to the cylinder 64 ahead of the cup 67 and to the annular chamber 76. This means may be of any desired form, for example, an ordinary reservoir, or a remote reservoir (not shown) may be employed in conjunction with the means shown in Figures 1 and 2. The master cylinder casting is provided with a laterally extending boss 98 in which is threaded a plug 99 connected by a union 100 to a pipe 101 leading to a suitable reservoir. The pipe 101 communicates through a passage 102 (Figure 2) with a chamber 103 in the boss 98. This chamber communicates through a passage 104 with the cylinder 64 just ahead of the cup 67 when the parts are in the "off" positions shown in Figures 1 and 2, thereby supplying replenishing fluid to the cylinder 64, if needed, when the parts return to the normal "off" positions shown. The chamber 103 communicates with another passage 105 open at all times to the chamber 76. This chamber is of such length as to communicate with the passage 105 in any position of the sleeve 65.

The master cylinder casting, as previously stated, seats against the motor wall portion 20 and projects into the motor as at 59. Into such end of the casting 58 projects a sleeve 110 carrying a spherical head 111 engaging in a spherical socket 112 formed in the adjacent end of the sleeve 65, thus providing for rocking movement of the sleeve 110 relative to the sleeve 65 for reasons which will become apparent. The spherical head 111 is annularly grooved as at 113 to receive a double lipped cup 114, and the head 111 is held in position by a ring 115 retained by a snap ring 116.

Figure 4:
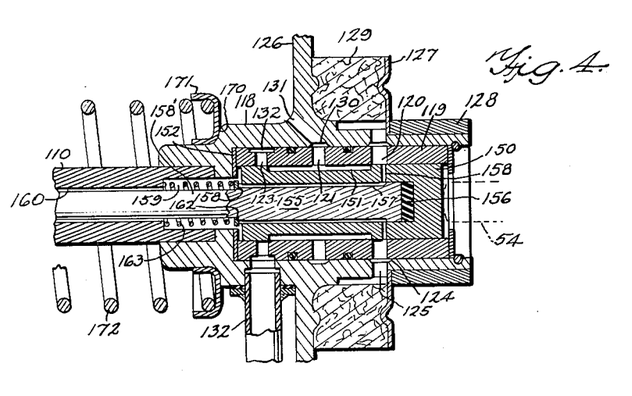
Figure 4 is an enlarged fragmentary sectional view through the valve mechanism and associated elements, showing the valve parts in lap position.

The sleeve 110 is carried by a valve housing 118 shown somewhat enlarged in Figure 4. This valve housing has a cylindrical valve seat 119 therein provided with atmospheric openings 120, motor pressure control passages 121 and vacuum passages 123. The passages or ports 120 communicate with an annular groove 124 in the valve housing 118, which groove communicates with the exterior of the housing 118 through openings 125. The valve housing 118 intermediate its ends carries a preferably integral flange 126 spaced from which is arranged a retaining plate 127 fixed with respect to the valve housing by a sleeve 128. Between the flange 126 and plate 127 is arranged a body 129 of an air-filtering material, thus acting as an air cleaner for air flowing therethrough into the ports 125. The pressure control passages or ports 121 communicate with an annular groove 130 and this groove, in turn, communicates through a passage 131 with the interior of the motor 15.

The ports 123 communicate with an annular groove 132 formed in the outer surface of the valve seat 119, and this groove, in turn, communicates with a pipe 132 connected to one end of a flexible hose 133 (Figure 1) leading to one end of an elbow 134 the other end of which projects through the wall 16 as at 135 for connection with a suitable pipe leading to a source of vacuum such as the intake manifold of the vehicle engine. The elbow 134 is sealed with respect to the wall 16, for example, by welding it in position.

As shown in Figure 1, the flange 126 is grooved as at 138 to receive the beaded adjacent end of an annular flexible diaphragm 139 retained in position by a ring 140. To the motor pressure plate 24 is connected an annular plate 141 (Figures 1 and 5) by bolts or the like 142, and this plate is provided with a bead 143 cooperating with the plate 24 to receive the beaded other end of the diaphragm 139. Thus the flange 126, diaphragm 139, and plate 141 form a chamber 144 open to the atmosphere through an opening 145 through which the adjacent end of the valve housing 118 may project, the opening being larger than the valve housing, as shown in Figure 1.

A spool valve 150 is arranged in the sleeve 119 and has a closed end engageable by the button 54 to be axially moved thereby upon operation of the treadle 48. The valve 150 is provided in its outer surface with an elongated annular groove 151 the ends of which are spaced apart a distance approximately equal to the distance between the closest limits of the ports 120 and 123 so that the valve is adapted to assume the lap position shown in Figure 4 with both air and vacuum cut off from the ports 121. The valve is normally arranged in the position shown in Figure 1 with the groove 151 communicating with the air ports 120 and disconnected from the vacuum ports 123, in which case atmospheric pressure will be present in the interior of the motor.

The left-hand end of the valve sleeve 119 engages an annular stop plate 152 which projects radially inwardly of the sleeve 119 and is spaced from the adjacent end of the valve 150 in the normal and lap positions of the valve. This space is adapted to be taken up under conditions of substantial brake application, as will become apparent.

A rod 155 projects into the valve 150 and a resilient washer 156 is interposed between this rod and the closed end of the valve. The rod 155 is longitudinally grooved as at 157 and one end of each groove communicates with a port 158. Each port 158 communicates at all times with one of the ports 120 and the grooves 157 extend through a shoulder 158' formed on the rod 157 for communication with a space 159 formed within the sleeve 110 and valve body 118. This space, in turn, communicates with a narrow annular space 160 surrounding the rod 155 within the sleeve 110, and the latter adjacent the forward or lower end of the rod 155 is constricted (Figure 2) as at 161 to form a bearing for the rod 155. Referring to Figure 2, it will be noted that the adjacent ends of the rods 93 and 155 are spaced from each other in the "off" positions of the parts and, accordingly, the rod 155 is movable from its "off" position, upon initial operation of the treadle 48 without imparting movement to the rod 93. A washer 162 engages the shoulder 158, and a spring 163 engages at one end against the washer 162 and at its opposite end against the left-hand end of the space 159 (Figure 4).

Figure 5:
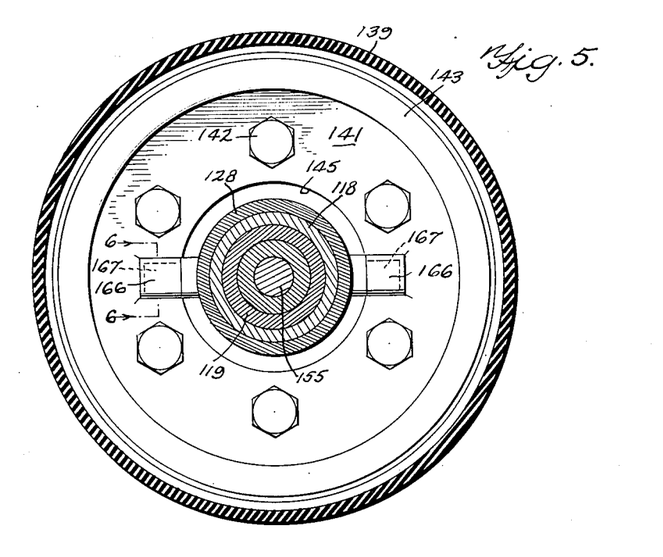
Figure 5 is an enlarged sectional view on line 5—5 of Figure 1.
Figure 6:
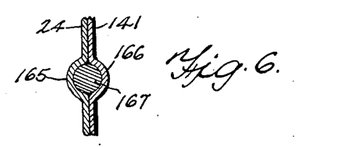
Figure 6 is a fragmentary detail sectional view on line 6—6 of Figure 5.

Referring to Figures 5 and 6, it will be noted that the plate 24 is provided on opposite sides of the opening 145 with semi-cylindrical depressions 165, and the plate 141 is provided with similar depressions 166. These depressions cooperate to form bearings at diametrically opposite sides of the valve housing 118 to receive trunnions 167 preferably formed integral with the valve housing 118. These trunnions serve to support the valve housing 118, and the elements associated therewith, with respect to the pressure plate 24 and to transmit movements of such plate to the valve housing and thence to sleeve 110 and plunger sleeve 65. They also permit rocking of the elements supported thereby to accommodate angular movements of rod 155 and sleeve 110 relative to the master cylinder, as will become apparent.

Referring to Figures 1 and 4, the valve housing 118 is shouldered as at 170 for engagement by a spring seat 171. One end of a return spring 172 engages the seat 171, and the opposite end of the spring surrounds the projecting end 59 of the master cylinder casting and engages the motor wall portion 20. This spring serves to return the movable motor parts, valve housing, etc., to their normal "off" positions, and such movement is limited by engagement of the head 111 (Figure 2) with the stop ring 115.

Various small leakage seals may be provided in the apparatus where needed, for example, around the valve sleeve 119 on the opposite sides of the ports 121, and around the plunger 90 (Figure 2). Such seals are conventional and form, per se, no part of the present invention and need not be described in detail.

It will become apparent that in the operation of the form of the invention described above, "feel" in the treadle 48 is provided by direct reaction through the system in accordance with fluid pressures in the master cylinder, this reaction being transmitted mechanically through plunger 90, stems 93 and 155, valve 150 and button 54. In the form of the invention shown in Figures 7, 8, and 9, hydraulic reaction also is provided, but in an entirely different manner.

Figure 7:
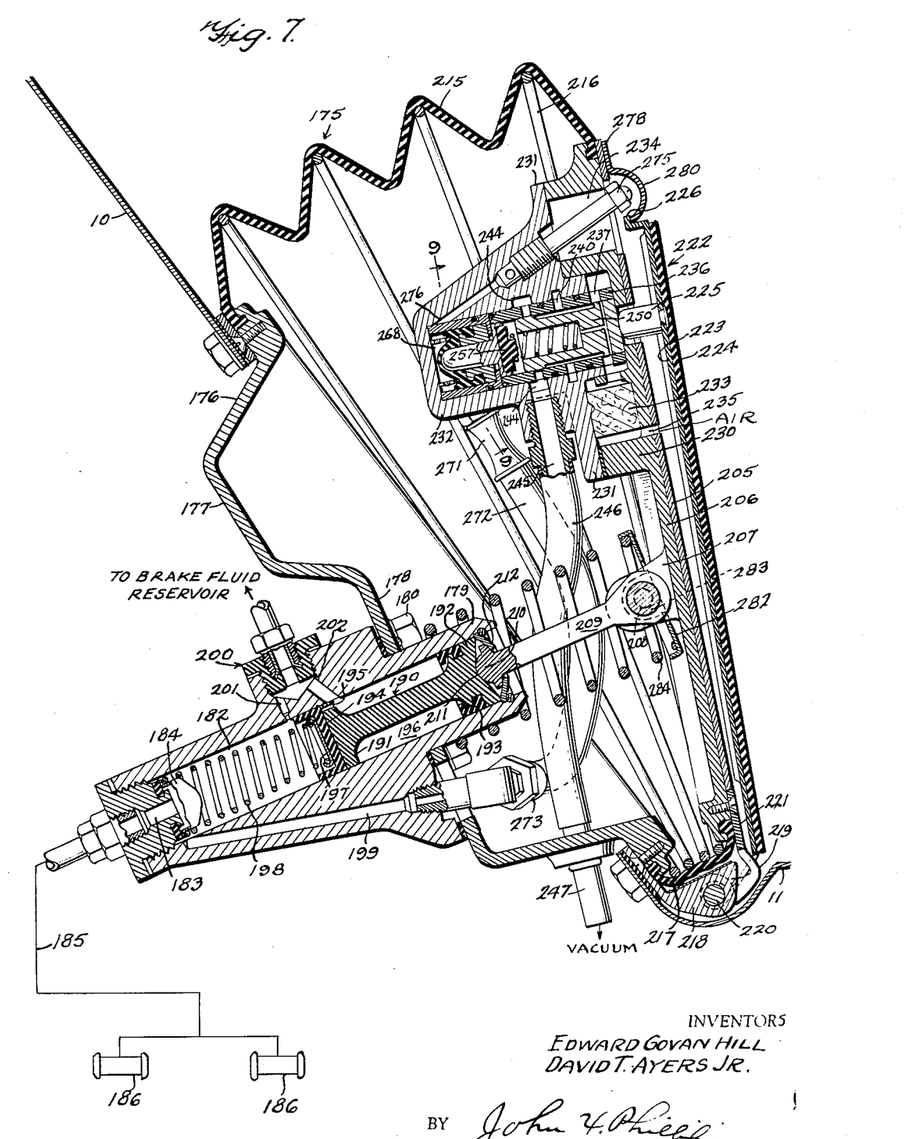
Figure 7 is a sectional view similar to Figure 1, showing a modified form of the invention.

Referring to Figure 7, it will be noted that a motor 175 similar to the motor described above is mounted with respect to the toe board and floor board of the vehicle, again indicated respectively by the numerals 10 and 11. The motor comprises a stationary wall 176 having a forwardly and downwardly bulged portion 177, for a purpose to be described, and a flat wall portion 178 adapted to receive the inner end of a master cylinder casting 179 fixed in position by screws 180. The master cylinder casting is provided with a cylinder 182 having an outlet opening 183 controlled by a conventional residual pressure valve 184, and the outlet opening 183 is connected by conventional lines 185 to the wheel cylinders 186.

A plunger 190 is operable in the cylinder 182 and is provided at opposite ends with heads 191 and 192 the latter of which is provided with a seal 193. A cupped seal 194 engages the head 191 and this head is provided with a small port 195 for the escape of fluid past the lip of the cup 194 from the annular space 196 provided around the stem of the plunger 190. A spring seat 197 engages the cup 194 and has its peripheral portions spaced from the bottom thereof to facilitate the flexing of the lip of the cup 194 under conditions to be described. A spring 198 is interposed between the seat 197 and the residual pressure valve 184. The casting 179 is provided with a reaction fluid passage 199 communicating at one end with the cylinder 182 adjacent the outlet end thereof.

As in the other form of the invention described, any suitable means may be provided for supplying hydraulic fluid to the cylinder 182. In the present case, a connection indicated as a whole by the numeral 200, similar to the fitting 99 and associated elements, supplies hydraulic fluid from any suitable source to the master cylinder through one passage 201 just ahead of the cup 197 and through a second passage 202 leading into the space around the stem of the plunger 190.

The motor 175 further comprises a movable pressure wall or casting 206 carrying ears 207 through which passes a pin 208 connected to one end of a rod 209. The other end of this rod has a head 210 arranged in engagement with the bottom of a recess 211 in the head 192 and maintained in position by a plate 212.

The motor 175 is further provided with a bellows 215. This bellows is similar to the bellows 30 previously described and is connected in substantially the same manner at its ends to the wall 176, and to the casting 206 by a plate 205. If desired, subtending rods 216, identical with the rods 33 previously described, may engage at their lower ends directly with the small bottom wall 217 of the bellows.

The motor wall 177 is provided with a hinge structure 218, and a corresponding structure 219 is secured to the casting 206, and these hinge structures are connected to a hinge pin 220 to support the movable motor plate for pivoted movement in the same manner as in the form of the invention described. The structure 219 includes a plate 221 secured to the casting 206 and cooperating with the plate 205 for securing the adjacent edge of the bellows to the casting 206.

Figure 8:
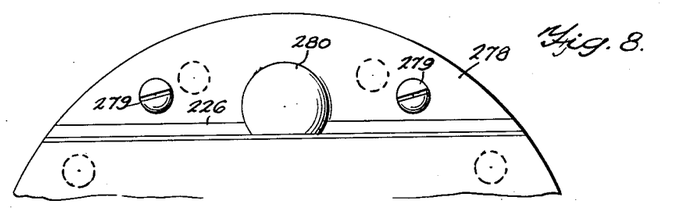
Figure 8 is an enlarged fragmentary face view of the upper end of the treadle in Figure 7 and associated elements.

A treadle indicated as a whole by the numeral 222 is arranged adjacent the movable motor wall and comprises a preferably steel plate 223 having a resilient facing sheet 224 fixed thereto to form a foot-engaging surface. The plate 223 carries a valve operating button 225, and the upper end of the plate 223 is provided with an inwardly offset lip 226 which may extend across the treadle as shown in Figure 8.

Figure 10:
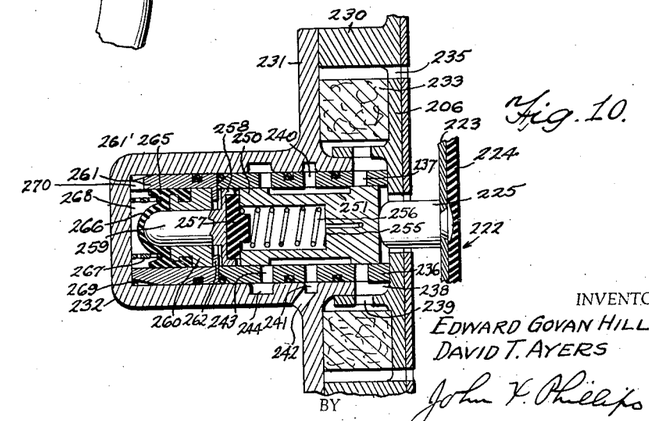
Figure 10 is an enlarged fragmentary sectional view of the valve mechanism in Figure 7, taken on line 10—10 of Figure 9, showing the parts in motor-energizing position.

The valve mechanism for the motor is shown in the "off" position in Figure 7 and in the operating position, on a slightly enlarged scale, in Figure 10.

The casting 206 carries an annular inwardly extending flange 230 against which is seated and secured a flange 231 integral with a valve housing 232. A body of an air cleaning material 233 is interposed between the flange 231 and casting 206, and the flange 230 is shaped at the top of the device to provide an opening 234 for a purpose to be described. The air cleaner 233 extends around the flange 231 except where the annular space within the flange 230 is interrupted by the opening 234. Air is supplied to the air cleaner 233 through a series of openings 235 through the casting 206 and plate 205.

The valve housing is provided therewithin with a valve sleeve 236 having a plurality of air ports 237 therethrough communicating with an annular surrounding space 238 and thence with the air cleaner through ports 239. The sleeve 236 is further provided with vacuum ports 240 in fixed communication with an annular groove 241 formed in the valve housing and communicating through a port 242 (Figure 10) with the interior of the motor. The valve sleeve 236 is provided with vacuum ports 243 communicating with an annular space 244 in the valve housing, and this space communicates in turn through a suitable fitting 245 with one end of a flexible hose 246 the other end of which is connected to a pipe 247 extending through the bottom of the motor wall 177. The outer end of the pipe 247 is adapted for connection through suitable piping with the intake manifold of the vehicle engine as a source of vacuum.

A valve spool 250 is arranged in the sleeve 236 and is provided with an annular external groove 251 in constant communication with the port 240 and adapted for selective communication with either the air ports 237 or vacuum ports 243, the valve being adapted to assume a lamp position, as in the form previously described, to cut off communication between the ports 240 and both sets of ports 237 and 243.

The valve 250 is provided with a bore 255 in which is arranged a spring 256, one end of the spring engaging the inner extremity of the recess 255 and the other end engaging a resilient seat 257 arranged in a cup 258 carried by a stem 259 having a semi-spherical outer end as shown in Figure 10.

The stem 259 is slidable in a bearing 260 mounted in a sleeve 261 arranged in abutting relation with the valve sleeve 236, and this sleeve is provided with an internal flange 262 against which the cup 258 seats when the parts are in the "off" position shown in Figure 7, in which case the seat 257 is spaced from the adjacent end of the valve spool 250.

The bearing 260 carries a seal 265 having a central hemispherical portion 266 engaging the correspondingly shaped end of the stem 259, and a perforated sleeve 267 engages the seal 265 to maintain it in position.

Figure 9:
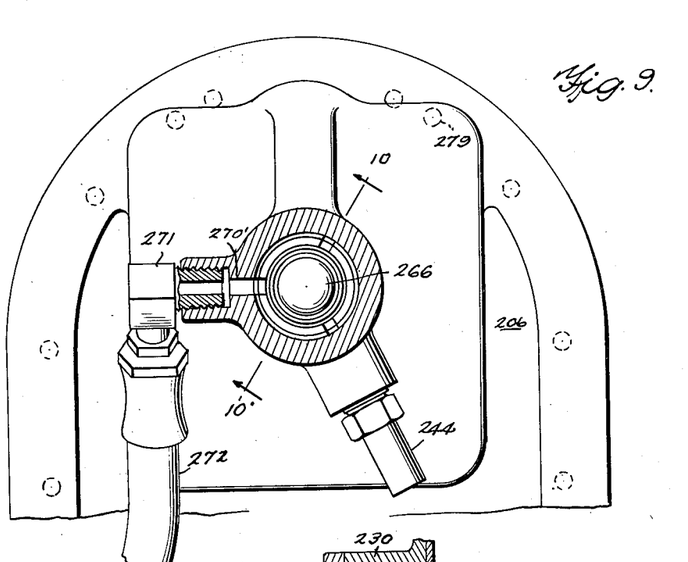
Figure 9 is an enlarged fragmentary sectional view on line 9—9 of Figure 7.

The seal 265 and sleeve 261 and the adjacent closed end of the valve housing 232 form a chamber 268. The adjacent end of the sleeve 261 is tapered to form an annular space 269 and is notched as at 270 to connect chamber 268 with such space. The space 269 communicates through a port 270' (Figure 9) with an angle fitting 271 to which is connected one end of a flexible hose 272. The other end of this hose is connected to a similar fitting 273 (Figure 7) threaded into the master cylinder casting 179 to communicate with the passage 199. Thus, master cylinder pressures are always communicated to the chamber 268 (Figures 9 and 10).

The chamber 268, as will be apparent from the foregoing description, will be filled at all times with hydraulic brake fluid and, accordingly, is preferably provided with "bleed" means for ridding it of air when the device is placed in operation. To this end, a bleed valve structure 275 is tapped into the top portion of the valve housing 232 through the opening 234 to bleed air from the chamber 268 through a passage 276. The bleed valve structure is conventional and need not be described in detail.

Across the top of the pressure plate 205 extends a plate 278 (Figures 7 and 8) shaped to correspond with the preferably arcuate upper edge of the pressure plate. The plate 278 is fixed in position by screws 279 and is provided with a central substantially hemispherical stop portion 280 which covers and protects the adjacent end of the bleed valve structure 275 and has its lower edge overlying the lip 226 to limit movement of the treadle 222 away from the pressure plate 205.

Suitable return spring means is provided to urge the pressure plate 205 to normal position. Plate 282 (Figure 7) surrounds the ears 207 and is provided with slotted ears 283 receiving projecting ends of the pin 208. The plate 282 forms a seat engageable with one end of a return spring 284, the other end of this spring surrounding the projecting end 179 of the master cylinder casting. Movement of the pressure plate 206 and associated elements to "off" position is limited by engagement of the head 210 with the plate 212.

Figure 11:
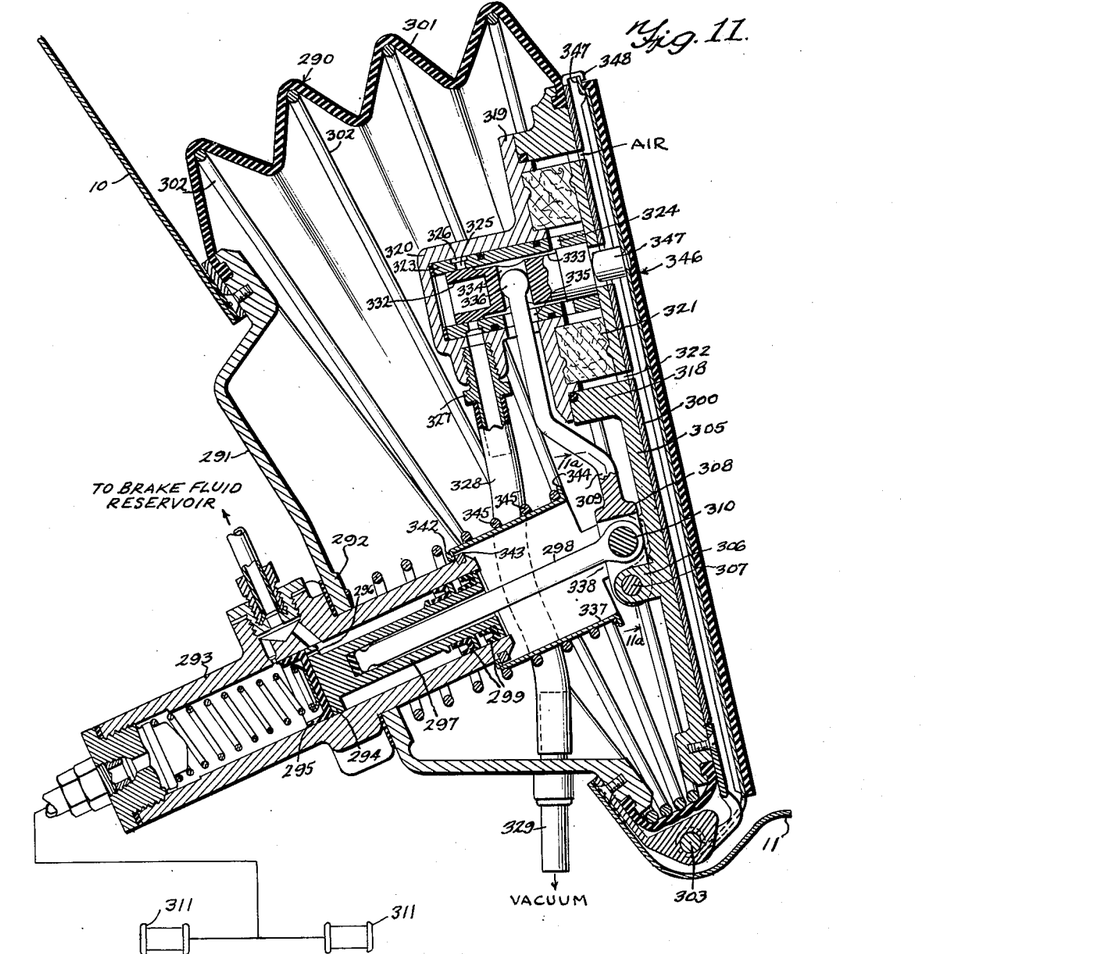
Figure 11 is a sectional view similar to Figures 1 and 7 showing a further modified form of the invention.
Figure 11A:
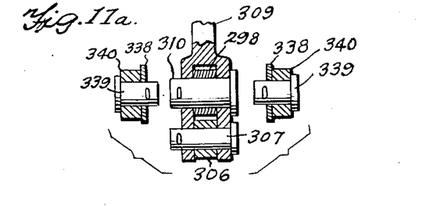
Figure 11a is a detail sectional view on line 11a—11a of Figure 11.

In the form of the invention shown in Figure 11, mechanical reaction means is provided in place of the hydraulic reaction means of the other two forms of the invention to establish "feel" in the treadle. Referring to Figure 11, the toe plate 10 and floor board 11 are again utilized for supporting the motor, which is indicated as a whole by the numeral 290. This motor comprises a stationary wall 291 fixed in the opening in the toe plate and provided with a flat wall portion 292 for the mounting of a master cylinder casting 293 which is substantially identical with the form shown in Figure 7 and need not be described in detail. The same means likewise may be employed for supplying the master cylinder with hydraulic fluid. In this case, a plunger 294 is slidable in the master cylinder and carries a cup 295 similar to the cup 194 and provided with a leakage port 296 which may be identical in structure and purpose to the port 195. The plunger 294 is carried by a rod 297 having a deep axial recess receiving a push rod 298. The rod 297 is suitably sealed in the master cylinder, as at 299.

The motor further comprises a pressure movable wall 305 and between this wall and the fixed wall 291 is connected a bellows 301 which may be identical with the bellows previously described and similarly provided with subtending rods 302 shaped as shown in Figure 3. In substantially the same manner as in Figure 7, the pressure movable wall 305 is pivotally supported as at 303 for rocking movement.

A bellows retaining plate 300 is carried by the pressure plate or casting 305 and the latter has formed integral therewith an ear 306 carrying a pivot pin 307 connected to a yoke 308 on the lower end of a lever 309. This yoke is pivotally connected as at 310 to the end of the rod 298, and movement of the lever 309 transmits movement to the rod 298 to actuate the plunger 294 to displace fluid from the master cylinder into conventional wheel cylinders 311. The pressure plate 305 is provided with an integral flange 318 to which is secured a flange 319 formed integral with a valve housing 320. Between the flange 319 and casting 305 is arranged a body of air filtering material 321 to which air flows through suitable inlet openings 322.

A valve sleeve 323 is arranged in the housing 320 and is provided with air ports 324 for the flow of air from the air cleaner. The sleeve 323 is provided with vacuum ports 325 communicating with an annular groove 326 formed in the outer surface of the valve sleeve 323 and communicating through a fitting 327 with one end of a flexible hose 328. The other end of this hose is connected to the inner end of a pipe 329 extending through the bottom of the motor wall 291 and having its end externally of the motor adapted for connection through a suitable line with the intake manifold of the vehicle engine.

A valve 332 is slidable in the sleeve 323 and is provided with an annular groove 333 adapted selectively to communicate with either set of ports 324 or 325, as will be obvious.

The groove 333 communicates with a diametrical opening 334 through the valve 332 and this opening communicates with the interior of the motor through aligned enlarged openings 335 through the sleeve 323 and valve housing 320. The upper end of the lever 309 extends through the openings 335 and has a circular upper end 336 arranged in and engaging the axially remote walls of the opening 334.

Return spring means is also provided in the form of the invention shown in Figure 11. A sleeve 337 surrounds the rod 298 and has ears 338 at one end connected to pins 339 carried by lugs 340 integral with the castings 305. The other end of this sleeve has an inturned flange 342 engaging a snap ring 343 carried by the master cylinder casting to limit movement of the sleeve 337 to the "off" position shown in Figure 11.

The right-hand end of the sleeve 337 is provided with a flange 344 engaged by one end of a return spring 345 the other end of which seats against the flat wall portion 292 of the fixed motor wall.

A treadle indicated as a whole by the numeral 346 is provided with a button 347 engageable with the valve 332. This treadle may be identical with the treadle 222 and need not be described in detail. The treadle 346 pivots about the pin 303 and has a lip 347' at the upper end engaging a stop element 348 at the upper end of the plate 300.

Figure 12:
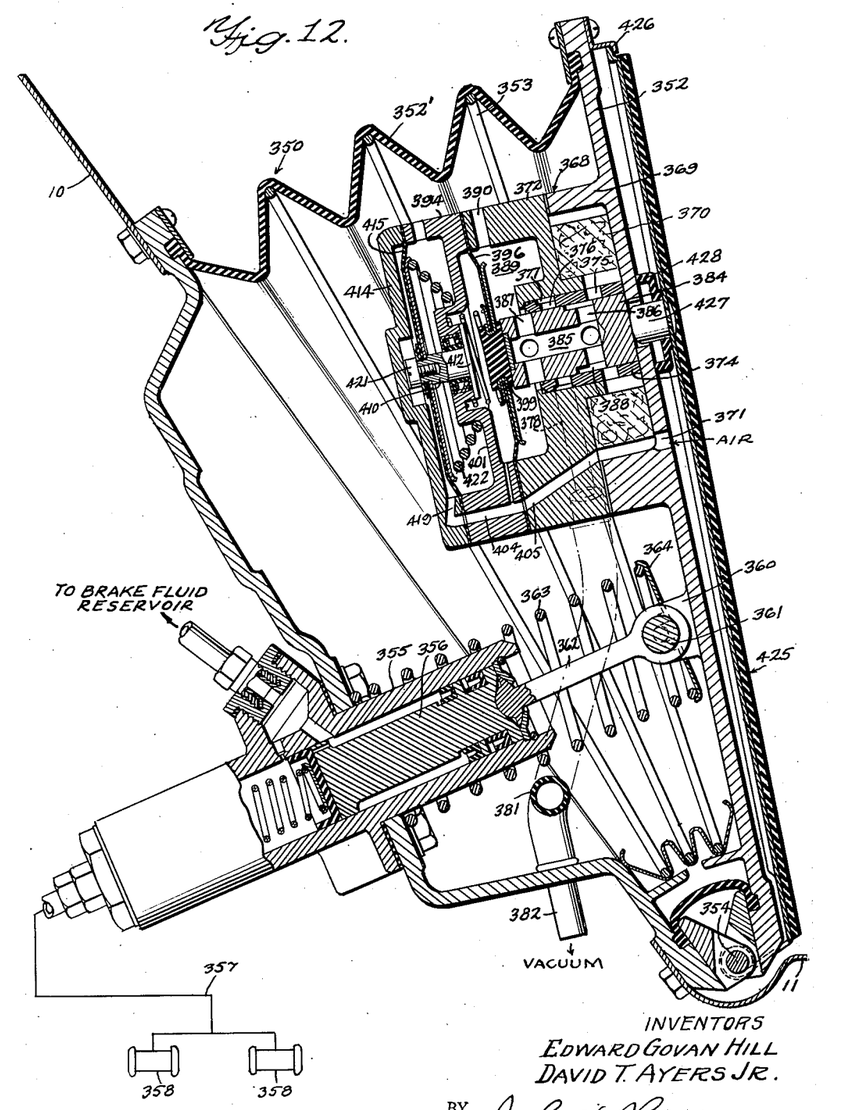
Figure 12 is a sectional view similar to Figure 1, showing a further modified form of the invention.
Figure 13:
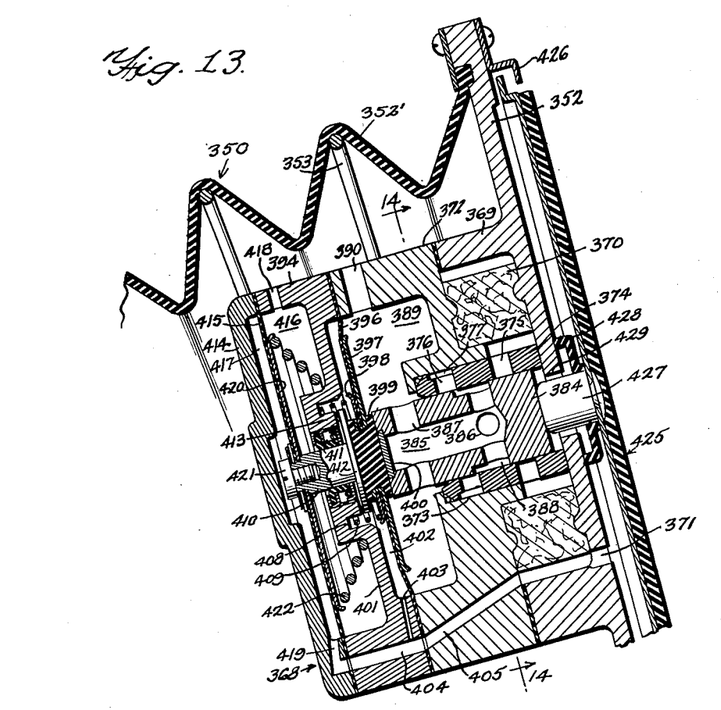
Figure 13 is an enlarged fragmentary detail sectional view of the valve mechanism in Figure 12, showing the parts in a motor energizing position.
Figure 14:
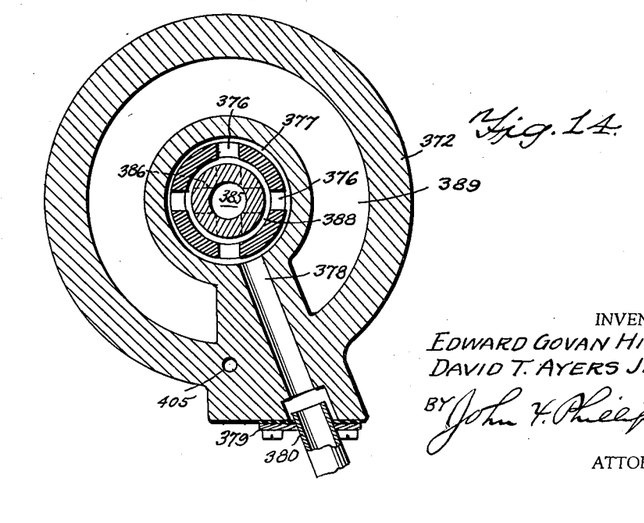
Figure 14 is a section on line 14—14 of Figure 13.

In Figures 12, 13, and 14, a further modified form of the invention is shown wherein the advantages of the previously described forms of the invention are retained in a simplified arrangement in which reaction against the treadle takes place in accordance with the degree of energization of the booster motor rather than in accordance with hydraulic pressures in the master cylinder.

Referring to Figure 12, the numerals 10 and 11 again indicate the toe and floor boards of the vehicle. A motor indicated as a whole by the numeral 350 and similar to the motor previously described is provided with a suitably shaped stationary wall 351 mounted in the same manner as before relative to the toe board of the vehicle. The motor further includes a pressure movable wall 352 connected to the stationary wall 351 by a bellows 352' again provided with subtending wire frames 353 mounted in the same manner as in Figure 1. The movable wall 352 is pivotally supported at its lower end as at 354, also in the same manner as Figure 1, and the structure in the lower portion of the motor including the pivotal support need not be described in detail.

The stationary wall 351 may be die-cast as in Figures 7 and 11 and has a rearwardly offset portion 351 to provide necessary space within the motor, as will become apparent. A master cylinder 355 is fixed with respect to the wall portion 351 and projects therethrough as in the previous cases, and a piston 356 in the master cylinder displaces fluid through lines 357 into the brake cylinders 358. Substantially the same means as previously described is employed for replenishing fluid in the master cylinder, and these parts need not again be described.

The movable motor wall 352 is provided with rearwardly extending ears 360 pivotally connected by a pin 361 to a rod 362 having a rocking connection with the piston 356, as in the form of the invention shown in Figure 7. A return spring 363 surrounds the inner end of the master cylinder and seats at one end against the wall portion 351. The other end of the return spring engages a seat 364 having a rocking connection with the pin 361.

The valve mechanism for the motor is bodily supported by the movable motor wall 352 and is indicated as a whole by the numeral 368. The parts of the valve mechanism are shown in the "off" positions in Figure 12 and the motor-energizing positions in Figure 13. A flange 369 is preferably cast integral with the wall 352 and houses therewithin an air cleaner 370 supplied with air through suitable openings 371. A housing 372 is fixed against the flange 369 and is provided with an axial recess 373 receiving a sleeve 374 provided with a plurality of openings 375 in constant communication with the atmosphere through the air cleaner. The sleeve 374 is provided inwardly of the openings 375 with a plurality of radial openings 376 communicating with an annular passage 377, which, as shown in Figure 14, is in communication with a passage 378 formed in the housing 372.

At the lower end of the passage 378 is fixed a plate 379 to which is welded or otherwise secured a tube 380 connected at one end of a hose 381 (Figure 12). The other end of this hose is connected to the inner end of a tubular member 382 extending through the bottom of the motor wall portion 351 for connection through a suitable duct with the intake manifold of the motor vehicle engine.

A slide valve 384 is mounted in the sleeve 374 and is axially bored as at 385 and is provided with two sets of radial openings 386 and 387 more clearly shown in Figure 13. The openings 386 communicate with an elongated annular groove 388 around the valve 384, and longitudinal movement of the valve determines communication between the groove 388 and the sleeve openings 375 and 376. The openings 387 are in fixed communication with a chamber 389 within the housing 372, and this chamber is in fixed communication with the interior of the motor through a port 390.

Another housing 394 is arranged in end-to-end alignment with the housing 372. A diaphragm 396 is clamped between the housings 372 and 394. Inwardly of the surrounding wall of the housing 372, this diaphragm is clamped between a plate 397 and a spring seat 398, both retained in position with respect to a thick rubber disk 399. This disk normally seats against the end of the valve 384 and against a disk 400 carried thereby and closing the end of the bored passage 385.

The housing 394 is provided with a wall 401 cooperating with the diaphragm 396 to form an atmospheric chamber 402. This chamber communicates through a passage 403 with a passage 404 drilled through the housing 394. The housing 372 is drilled to provide a passage 405 communicating at one end with the passage 404 and at its opposite end with the atmospheric openings 371. Accordingly, it will be apparent that atmospheric pressure is always present in the chamber 402.

The wall 401 is recessed as at 408 to house a spring 409 which urges the diaphragm 396 and washer 399 toward the valve 384, and this spring maintains under all conditions engagement of the washer 399 with the end of the valve 384.

A rod 410 is slidable through suitable packing 411 carried by the wall 401, and the inner end of the rod 410 carries a head 412 engageable as described below with the washer 399 when the motor is energized. When the motor is de-energized, the head 412 is held seated, by means to be described, against a flange 413 carried by the wall 401.

A cap 414 is arranged in alignment with the housing 394 and the head and housing referred to clamp therebetween a diaphragm 415 forming a pair of chambers, 416 in the housing 394 and 417 in the cap 414. The chamber 416 is in constant communication with the interior of the motor through a port 418, while the chamber 417 is maintained in communication with the atmosphere through a passage 419 communicating with the passage 404. The diaphragm 415 engages against a plate 420 carried by the rod 410 and maintained in position thereon by a nut 421. A spring 422 engages at one end against the plate 420 and at its opposite end against the wall 401, thus urging the head 412 against the flange 413, the head 412 being disengaged from the washer 399 when the motor is de-energized as shown in Figure 12.

A treadle indicated as a whole by the numeral 425 is pivoted on the pin 354 (Figure 12) as in the cases previously described, and this treadle need not be referred to in detail. It is apparent that the treadle is movable relative to the motor wall 352 and is limited in its movement away from such wall by an overhanging stop 426. The treadle carries a button 427 engageable with the valve 384, and if desired, a resilient shell 428 may surround the button 427 and engage a movable motor wall 352 to exclude dirt and foreign material from finding its way into the valve mechanism through the opening 429 in the wall 352, through which the button 427 projects.

Operation

The operation of the form of the invention shown in Figures 1–6, inclusive, is as follows. The pipe 101 is connected to a suitable reservoir to supply hydraulic fluid to the master cylinder, and for the purpose of the present disclosure it may be considered that the chamber 103 (Figure 2) constitutes a reservoir. This reservoir communicates through passage 104 with the master cylinder chamber 64 when the parts are in the "off" position shown in Figures 1 and 2. The reservoir also communicates through passage 105 with the annular space 76 to supply fluid through passage 77 to the back or right-hand end of the cylinder 78. The communication of the annular space 76 thus referred to is maintained throughout the movement of the plunger sleeve 65, the annular space 76 being suitably elongated for this purpose.

The plate 24 of the motor constitutes the pressure movable element of the motor and forms as well an end wall of the motor as will be apparent. This wall obviously is subject on its outer face at all times to atmospheric pressure, and atmospheric pressure is present within the motor when the parts are in the "off" position shown.

The valve 119 normally occupies the position shown in Figure 1. The interior of the motor is in communication with the atmosphere through passage 131, groove 130, ports 121, elongated groove 151, ports 120 and 125, the air cleaner 129, chamber 144 and opening 145. Accordingly, all of the parts will be in their "off" positions and will be biased to such positions by the various springs shown in Figure 1.

It will become apparent that due to the follow-up action of the valve 150 relative to the valve housing 118, there will be limited relative movement between the atmospheric ports 120 and the adjacent end of the groove 151, and between the vacuum ports 123 and the other end of the groove 151. At the same time, the control ports 121 communicate at all times with the groove 151 and with the interior of the motor through passage 131 (Figure 4).

The spring 163, more clearly shown in Figure 4, normally biases the valve 150 to the "off" position shown in Figure 1, and through contact of the valve 150 with the button 54, the treadle 48 is similarly biased to the "off" position with the lip 53 (Figure 1) engaging the stop lip 42.

When the brake is to be operated, the operator will depress the pedal 48 and the button 54 will move the valve 150 first to the lap position shown in Figure 4 and then further to the left to the operative position. In the lap position of the parts, the groove 151 will be moved to a position in which it is cut off from communication with both sets of ports 120 and 123. Slight additional movement of the valve 150 opens the groove 151 to the ports 123, thus connecting the latter ports to the interior of the motor through groove 151 and ports 121 and 131. The ports 123 being in communication with the source of vacuum through pipe 132, flexible hose 133, etc., air will be exhausted from the interior of the motor, thus establishing differential pressures on opposite sides of the pressure plate 24 to cause this plate to turn in a counterclockwise direction (Figure 1) about the axis of the pin 25. This operative movement of the pressure plate 24 takes place within the free movement of the treadle 48 relative to the movable parts of the motor unless the treadle is depressed very rapidly, but this does not affect the functioning of the parts but merely connects the source of vacuum to the maximum extent with the interior of the motor to establish differential pressures extremely rapidly.

Referring to Figure 2, it will be noted that the adjacent ends of the rods 93 and 155 are spaced when the parts are in their "off" positions. Therefore, initial operation of the treadle, which also moves the rod 155, takes place against no resistance except for that provided by the relatively light spring 163 (Figure 4). Thus the operator is given no false "feel" which would be caused by the building up of pressure in the master cylinder chamber 64 against the resistance of the residual pressure valve 69', in the initial operation of the booster mechanism. It will be apparent that the valve housing and associated elements are supported by and movable with the pressure plate 24 through the medium of the trunnions 167 (Figures 5 and 6), and these trunnions turn about the axis of the pin 25 when the motor is operated. Some misalignment then occurs between the axis of the sleeve 110 and its rod 155 and the axis of the movable parts within the master cylinder. This slight misalignment is compensated for by the provision of the spherical head 111 engaging the spherical socket 112.

As the pressure plate 24 moves, it transmits movement through trunnions 167, valve housing 118, and sleeve 110 to the master cylinder plunger sleeve 65 to advance this element to displace fluid from the master cylinder through the brake lines and into the brakes.

As the foregoing operation takes place, it will be apparent that the plunger 90 (Figures 1 and 2) moves bodily with the sleeve 65, the spring 94 urging the plunger 90 toward the left in Figure 2 to maintain the right-hand side of the slot 92 in engagement with the pin 91. Initially, therefore, the rod 93 advances ahead of the rod 155 and maintains the spaced relationship between the ends of these rods.

However, upon the building up of a predetermined pressure in the master cylinder chamber 64, this pressure will act against the adjacent end of the plunger 90 to urge it relatively toward the right in Figure 2 to compress the spring 94. It will be apparent that the spring 94 serves to delay engagement between the ends of the rods 93 and 155 and thus delays the transmission of hydraulic reaction from the master cylinder chamber 64 through rods 93 and 155 and thence through valve 150 to the treadle 48 until a predetermined hydraulic pressure has been built up in the chamber 64. This predetermined pressure usually is preferably from 30 to 60 p. s. i. In the form of the invention shown in Figure 1, therefore, the operator will meet with negligible resistance to pressure on the treadle 48 until a predetermined pressure is built up in the master cylinder, this pressure being determined by the loading of the spring 94. Thereafter, contact between the ends of the rods 93 and 155 affords a direct transmission of hydraulic reaction forces from the plunger 90 to the treadle to provide the latter with accurate "feel."

The valve device shown in Figures 1 and 4 provides for a perfect follow-up action of the pressure plate 24 and the elements actuated thereby, with relation to movement of the treadle 48. Whenever movement of the treadle 48 is arrested, a slight additional movement of the valve housing 118 with the pressure plate 24 will establish a lap position of the valve as shown in Figure 4 and arrest movement of the pressure plate 24. Any tendency of the pressure plate to overrun such position, in the downward movement of the treadle, will close the vacuum ports 123 and crack the air ports 120 to communication with the groove 151, thus admitting to the motor sufficient air to arrest movement of the pressure actuated parts.

The brakes are released by reversing the operation referred to. When pressure is reduced against the treadle 48, the spring 163 (Figure 4) tends to return the valve 150 to its normal position, thus cutting off communication between the source of vacuum and the interior of the motor and connecting the latter to the atmosphere, whereupon the return springs will move the parts back to their normal "off" positions. Referring to Figure 4, it will be noted that because of the limited movement of the valve 150 relative to the sleeve 119, the ports 158 will always communicate with the ports 120, thus connecting the space 159 to the atmosphere at all times through grooves 157.

It is highly desirable, as is well known, to prevent reduction of pressure in the brake lines below atmospheric pressure. When the fluid displacing parts of the apparatus are returned very rapidly to their "off" positions, there is a tendency for the pressure in the master cylinder chamber 64 to drop below atmospheric pressure. This is prevented with the arrangement shown, by virtue of the use of the plunger 81 and associated elements. The spring 84 normally maintains the plunger 81 in the position shown in Figure 1. Any tendency for the capacity of the chamber 64 to increase too rapidly will result in establishing differential pressures on opposite sides of the plunger 81, and the lip of cup 82 will flex inwardly for the passage therearound of additional fluid through port 85 to the chamber 64. If the volumetric demands of the chamber 64 are not satisfied by such operation, the plunger 81 may move toward the left to reduce the capacity of the left end of the cylinder 78 to thus supply additional fluid to the chamber 64.

When the foregoing occurs, it will be apparent that there will be an excess of fluid in the chamber 64. When the parts reach the "off" position, this excess fluid, if any, can return to the reservoir through port 104.

The operation of the form of the invention shown in Figures 7–10, inclusive, is similar to the operation described above, except that the hydraulic reaction is not transmitted in a direct line from the master cylinder to the treadle. The operation of the valve mechanism is substantially identical with that described above. The ports 237 are in constant communication with the atmosphere, and in the "off" positions of the parts, air flows through these ports, through groove 251 (Figure 10), thence into the interior of the motor through port 242. Operation of the treadle 222 causes the button 225 to move the valve 250, first to the lap position cutting off communication between the groove 251 and both sets of ports 237 and 243, then to an operative position such as is shown in Figure 10. Under such conditions, air will be withdrawn from the interior of the motor through port 242, valve groove 251, ports 243, and the flexible hose 246 (Figures 7 and 9) and associated elements.

The exhausting of air from the interior of the motor establishes differential pressures on opposite sides of the pressure plate 206, and the motor will operate to advance the plunger 190 (Figure 7) to displace fluid from the master cylinder into the brake lines. It will be noted in Figure 7 that the seat 257 is normally spaced from the adjacent end of the valve 250, and initial movement of the treadle 222 and valve 250 takes place against the minor resistance of the spring 256. Upon the building up of a predetermined hydraulic pressure in the master cylinder chamber 182, such pressure will be communicated through passage 199, flexible hose 272, fitting 271 (Figure 9), port 270 to chamber 268 to react against the diaphragm 266 (Figure 10) to move the plunger rod 259 toward the right to engage the seat 257 with the valve 250. Beyond the point to which the predetermined pressure referred to is built up, there will be maintained against the valve 250, and accordingly against the treadle, a hydraulic reaction proportionate to the pressure in the master cylinder 182. Thus, the treadle is always provided, under operating conditions, with the proper degree of "feel." The proportionate reaction in this case will depend upon the cross sectional area of the reaction plunger 259 (Figure 10) and the lever ratios between the button 225, pin 220, and the point of contact of the foot on the treadle 224. This proportionate feel, therefore, is a matter of preference and design.

The device in Figure 7 also prevents the occurrence of a substantial drop in pressure in the chamber 182 when the parts are suddenly released from brake-applying positions. The spring seat 197 (Figure 7) prevents the application of pressure from spring 198 to the cup 194 adjacent the periphery thereof, and the lip of this cup, accordingly, is free to flex for the flow of fluid from space 196 through port 195 into the chamber 182 to prevent excessive drops in pressure therein.

The form of the invention shown in Figure 11 operates substantially identically with the form shown in Figures 7–10, inclusive, except for the means for transmitting hydraulic reaction forces to the treadle. In Figure 11, depression of the pedal 346 moves the valve 332 to energize the motor in the same manner as in the previous form of the invention, except that the openings 334 and 335 are utilized to connect the groove 333 to the interior of the motor. Energization of the motor causes the pressure plate 300 to swing counterclockwise in the same manner as before, thus applying force through pin 307, lever 309, and pin 310 to the rod 298 and thence to the fluid displacing plunger 294. The operator assists in this operation by applying his force to the upper end of the lever 309, and it will be apparent that the operator will feel a reaction against the treadle 346 in proportion to the hydraulic pressures in the master cylinder. In this case, however, there is no lost motion between the treadle 346, lever 309, rod 298 and plunger 294, and in accordance with the ratios of the lever arms involved, the operator will feel throughout the range of movement of the treadle a reaction proportionate to pressures in the master cylinder.

Substantially the same results are obtained with the form of the invention shown in Figures 12, 13, and 14, including all of the highly advantageous results of this type of installation. In the fourth form of the invention, however, pedal reaction is accomplished by differential pressures affecting the motor rather than by hydraulic pressures in the master cylinder. The structure in Figures 12, 13 and 14 has the advantage of being most economical to manufacture, assemble, and install.

The valve parts and associated elements, together with the treadle and master cylinder piston normally occupy the positions shown in Figure 12. Under such conditions the valve groove 388 communicates with the atmospheric openings 375 and, accordingly, air is supplied to the interior of the motor through passage 385, ports 387, chamber 389 and port 390, and pressures on opposite sides of the motor wall 352 will be balanced. To operate the booster mechanism, the operator will depress the pedal, which will first move the valve to lap position. In this connection, it will be noted that the length of the valve groove 388 approximately coincides with the distance between the adjacent limits of the sleeve openings 375 and 376 and in the lap position, the groove 388 will be out of communication with both sets of sleeve ports 375 and 376. The slightest additional treadle movement will move the valve 384 to an operative position, for example as shown in Figure 13. The interior of the motor will then be connected to the source of vacuum through port 390, chamber 389, ports 387, passage 385, groove 388, and thence through ports 376, groove 377 (Figure 14), passage 378, pipe 381, etc. The exhaustion of air from the motor establishes differential pressures on opposite sides of the wall 352, and this wall will move in follow-up action relative to movement of the treadle. As movement of the treadle is arrested, slight additional movement of the wall 352 will be transmitted to the sleeve 374 to reestablish the lap position. When the pedal is released, the valve 384 reassumes the position shown in Figure 12, connecting the interior of the motor to the atmosphere. The return spring 363 then returns the movable motor wall 352 to the normal "off" position, and the spring 409 returns the valve 384 to normal position, together with the treadle 425.

The spring 409 preferably is relatively light and need be tensioned only slightly more than necessary to return the valve and treadle to the normal positions. Therefore, there is very little resistance to movement of the treadle 425 from its normal position in order to operate the valve mechanism to initially energize the motor. If any motor manufacturer desires a slightly greater initial resistance, a slightly stronger spring 409 may be employed.

As soon as initial energization of the motor 350 takes place, obviously sub-atmospheric pressure will be present in the chamber 389 to exactly correspond to that in the interior of the motor. Thus, the same differential pressures affecting the movable motor wall 352 will affect the diaphragm 396 to resist treadle operated movement of the valve 384 in a motor energizing direction. This resistance to movement of the treadle provides the latter with a reaction directly proportional to such initial energization of the motor. During this time, the head 412 will remain in engagement with the flange 413 due to the tension of the spring 422. Contact of the brake shoes with the brake drums of a motor vehicle in most instances takes place at a hydraulic brake fluid pressure of from 60 to 80 p. s. i., although in some brake systems the pressure is slightly higher. The spring 422 is tensioned for actuation of diaphragm 415 just prior to lining contact at the brakes. Whereas the diaphragm 396 becomes effective as soon as differential motor pressures exist and becomes increasingly effective as motor energization increases, the diaphragm 415 does not come into operation until just prior to lining contact, at which time the spring 422 will be overcome and differential pressures on opposite sides of the diaphragm 415 will move the head 412 into engagement with the resilient washer 399 to add its force to that of the diaphragm 396 to offer further increased resistance to treadle operation.

Reaction against the treadle will progressively increase in accordance with the degree of energization of the motor 350 without the operator's applying any direct force against the wall 352, and during this period all of the work of displacing fluid from the master cylinder will be performed by the motor.

At relatively higher braking pressures, the operator will progressively increase his pressure against the treadle beyond the elastic fluid reaction transmitted by the diaphragms 396 and 415. The head 412 will then be moved into engagement with the flange 413 and the operator in further depressing the pedal will then transmit direct force through the housing members surrounding the valve mechanism and thence through the movable motor wall 352 to the rod 362 to assist the motor in effecting a maximum brake application, if necessary or desired.

It will be apparent that a spring 422 of any desired tension may be employed to predetermine the differential motor pressures which will cause the diaphragm 415 to become effective in transmitting reactions to the treadle. It also will be apparent that the degree of reaction may be predetermined by employing effective diaphragm areas of different sizes for either or both of the diaphragms 396 and 415 in accordance with the cross sectional areas of the chambers on opposite sides of these diaphragms.

In each of the forms of the invention, movement of the treadle relative to parts of the motor is limited so that in the event of a failure of power, the parts may be manually operated. In the form of the invention shown in Figures 1–6, inclusive, the taking up of the play between valves 150 (Figure 4) and the annular ring 152 will cause positive movement to be transmitted to the valve housing 118 and thence through the parts mechanically connected to this housing to effect movement of the plunger sleeve 65. At the same time, the button 54 will positively move the valve 150 and rod 155, and after the building up of a predetermined pressure in the master cylinder, the rod 155 will move the rod 93. Under such conditions, therefore, the plunger 90 and sleeve 65 will be manually moved as a unit.

In the form of the invention in Figures 7–10, inclusive, the same result is accomplished by taking up the play between the valve 250 and the seat 257 to transmit movement through flange 262 to the valve housing to effect the necessary manual operation of the parts.

In Figure 11, play between the valve 332 and the end of the valve housing 320 will accomplish the same result. In Figure 12, manual operation may be effected upon a failure of power in the motor by depressing the treadle to take up play between the washer 399 and head 412 with this head engaging the flange 413 to transmit movement to the motor wall 352 in the same manner as described above for a final brake application.

As previously stated, it has been advantageous in the past to combine, beneath the toe board or floor board of a vehicle, a master cylinder and a booster unit, in the interest of economical manufacture. Frequently this can not be done, because such a unit is relatively long and requires substantial space. This disadvantage has been overcome by employing a conventional pedal operated master cylinder and by conveying fluid from such master cylinder to a booster unit arranged at any convenient point. Such a booster unit required the use of its own master cylinder, and fluid from the conventional master cylinder was used largely to operate the valve mechanism of the booster. Such an installation solved to an appreciable extent the problem of space for the installation of boosters, but the cost of manufacture was relatively high.

The present construction is highly advantageous over prior constructions since it permits the combination of a booster mechanism with a single master cylinder while requiring less space beneath the toe board than was previously required by the more expensive units employing a conventional master cylinder and a separate booster piped to the master cylinder. The present construction, moreover, is substantially more economical to manufacture and install than is true of any of the prior constructions referred to. Most of the metal parts can be either die-stamped or die-cast, and no metal motor casing with a pressure movable unit therein is required. The pressure movable unit of the present motor is an external wall of the motor, and the use of the bellows eliminates the necessity for a metal casing.

Particular attention also is invited to the fact that in the use of the simplest prior types some bracket means had to be provided for the supporting of the master cylinder, and where separate master cylinders and boosters were employed, separate supporting brackets had to be manufactured and installed. The present construction requires no brackets of any kind. It merely is necessary in the manufacture of the toe board to punch therethrough an opening of the proper size for the mounting of the desired booster unit. If no booster unit is to be used, this opening may be closed very simply by an inexpensive flat metal plate. Where the booster is to be employed, the entire unit may be pre-assembled and then mounted as a unit, as shown in Figures 1, 7, 11, and 12, it merely being required that a few bolts be inserted through preformed openings in the booster unit and in the toe board.

The present construction employs as the stationary wall of the motor the element which forms in effect a part of the toe board, and substantially the entire motor is mounted above and rearwardly of the toe board, thus greatly economizing in the space required by the unit and permitting the unit to be installed on any motor vehicle. The motor is substantially out of sight and is not in any sense cumbersome to the driver of the vehicle. It is becoming increasingly the practice to use broad brake pedals, particularly on cars equipped with automatic transmissions, thus permitting the driver to operate the brake pedal with either his right or left foot with equal facility. The use of a broad treadle in the present instance provides the facility of operation just referred to and at the same time provides a protective cover for the motor. As a matter of fact, if desired, the treadle obviously may be made even wider than the motor.

It is also becoming the increasing tendency in the motor vehicle industry to use relatively low brake operating treadles in place of conventional high treadles which require the operator to move his foot upwardly and downwardly in transferring it between the accelerator pedal and the brake pedal. The present construction renders highly practicable the use of a relatively low treadle to facilitate transferring the foot from the accelerator pedal to the brake operating pedal. Moreover, the combination shown is such that the pivot axis for the treadle is relatively close to the point at which the operator normally rests his heel on the floor board, and this facilitates brake operation merely by the forward rocking of the foot while resting the heel on the floor board.

From the foregoing it will be apparent that the present construction is highly practicable and possesses numerous advantages over prior constructions. Attention also is invited to the fact that the nature of the structure is such that, as distinguished from prior constructions, the size and power of the motor is substantially unlimited, since the motor may be made of any length and width within reasonable limits. As distinguished from this possibility, the motors of present booster units are limited as to capacity because of limits imposed on the sizes of the motors by available space for installation.

We claim:

1. A booster brake mechanism for motor vehicles comprising a master cylinder having an outlet for connection with the vehicle brakes, a piston in said master cylinder, a differential fluid pressure motor having a stationary wall fixed with respect to said master cylinder, a rigid movable pressure wall mounted for turning movement on a fixed axis and having mechanical connection with said piston, a flexible casing connected between said walls, a valve mechanism for controlling differential pressures in said motor, and a treadle connected to said valve mechanism and movable progressively from a normal position to operate said valve mechanism and energize said motor.

2. A booster brake mechanism comprising a differential fluid pressure operated motor having a stationary wall, a movable pressure wall and a flexible casing wall connected to peripheral portions of said stationary and movable walls to form therewith a differential fluid pressure motor chamber, a master cylinder fixed with respect to said stationary wall and having an outlet for connection with the vehicle wheel cylinders, a piston in said master cylinder having mechanical connection with said movable wall, a flexible conduit within said motor chamber having one end carried by said stationary wall and opening therethrough for connection with a source of pressure different from the atmosphere, a valve mechanism within said motor chamber supported by said movable wall and having relatively movable elements occupying normal positions connecting said motor chamber to the atmosphere and being relatively movable to connect said motor chamber to the other end of said flexible conduit, and a treadle arranged externally of said motor adjacent and normally substantially parallel to said movable wall and having mechanical connection with one of said valve elements to effect relative movement between such elements to energize said motor upon movement of said treadle from a normal "off" position, said treadle having limited lost motion connection with said movable wall, said movable wall being mounted to turn on a fixed pivot axis adjacent one edge thereof, said treadle being pivoted to turn on the same axis.

3. A booster brake mechanism for motor vehicles comprising a differential fluid pressure operated motor having a stationary wall, a rigid movable pressure wall mounted to rock on a fixed axis adjacent one edge of such wall, and a bellows connecting said walls and defining therewith a differential pressure motor chamber, a stationary master cylinder having an outlet for connection with the vehicle wheel cylinders, a piston in said cylinder having mechanical connection with said movable wall to be operated thereby upon turning movement thereof in one direction about said axis to displace fluid from said master cylinder, a follow-up valve mechanism comprising a pair of relatively movable valve elements occupying normal relative positions connecting said motor chamber to the atmosphere and being relatively movable to connect said chamber to a source of sub-atmospheric pressure, and a manually operable element having mechanical connection with one of said valve elements and movable from a normal position to effect movement of such valve element to energize said motor.

4. Apparatus constructed in accordance with claim 3, wherein said manually operable element comprises a treadle arranged adjacent said movable wall and pivoted to turn on said axis, said treadle having limited lost motion connection with said movable wall and normally occupying a position from which it is movable relative to said movable wall to effect movement of said one valve element.

5. In combination with a vehicle floor board and toe board dividing the engine compartment of the vehicle from the driver's compartment and having an opening therethrough of substantial area above said floor board, a booster brake mechanism comprising a motor having a stationary wall fixed to the toe board within said opening, a rigid movable wall mounted to turn on a fixed axis adjacent its lower edge and adjacent the floor board, and a bellows connected between said walls to form therewith a differential fluid pressure motor chamber, a master cylinder carried by said stationary wall and projecting into the engine compartment and having an outlet for connection with the vehicle wheel cylinders, a piston in said cylinder having mechanical connection with said movable wall, said movable wall normally diverging upwardly from said stationary wall, a follow-up valve mechanism having a pair of relatively movable elements normally occupying positions connecting said motor chamber to the atmosphere, and manually operable means in the driver's compartment for effecting relative movement of said valve elements to connect said motor chamber to a source of sub-atmospheric pressure.

6. The combination defined in claim 5, wherein said manually operable element comprises a treadle in the driver's compartment arranged adjacent and normally in slightly spaced relation to said movable wall and mounted to turn on said axis, said treadle being engageable with said movable wall, upon predetermined movement of said treadle from a normal position.

7. The combination defined in claim 5, wherein said valve mechanism is mounted wholly in said motor chamber and supported by said movable wall, a button projecting through said movable wall, and engaging one of said valve elements, said manually operable element comprising a treadle mounted to turn on said axis and arranged adjacent said movable wall, said treadle having a normal position from which it is movable independently of said movable wall to operate said button and effect relative movement of said valve elements from their normal positions.

8. In combination with the floor board and toe board of a motor vehicle, a differential fluid pressure operated motor having a stationary wall forming in effect a part of the toe board, a master cylinder carried by said stationary wall and having an outlet for connection with the vehicle brakes, a piston in said master cylinder, said motor having a movable pressure wall pivotally supported for turning movement on a horizontal fixed axis adjacent its lower edge and adjacent the floor board of the vehicle, a bellows connected at its ends to the peripheral portions of said stationary and movable walls and forming therewith a differential fluid pressure motor chamber, a valve mechanism within said motor comprising a relatively stationary element carried by said movable wall and a movable valve element normally occupying a position relative to said relatively stationary valve element in which said motor chamber communicates with the atmosphere, means biasing said movable valve element to said normal position, and a treadle mounted adjacent and normally substantially parallel to said movable wall and mounted to turn on said axis, said treadle having limited movement away from said movable wall under the influence of said biasing means, said treadle being movable toward said movable wall independently thereof to move said movable valve element to connect said motor chamber to a source of sub-atmospheric pressure.

9. A booster brake mechanism for motor vehicles comprising a differential fluid pressure operated motor having a stationary wall, a movable pressure wall mounted to rock on a fixed axis adjacent one edge of such wall, and a bellows connecting said walls and defining therewith a differential pressure motor chamber, a stationary master cylinder having an outlet for connection with the vehicle wheel cylinders, a piston in said cylinder having mechanical connection with said movable wall to be operated thereby upon turning movement thereof in one direction about said axis to displace fluid from said master cylinder, a follow-up valve mechanism comprising a pair of relatively movable valve elements occupying normal relative positions connecting said motor chamber to the atmosphere and being relatively movable to connect said chamber to a source of sub-atmospheric pressure, a treadle having mechanical connection with one of said valve elements and movable from a normal position to effect movement of such valve element to energize said motor, said movable wall and said treadle being pivoted adjacent one edge of said movable wall to turn about a common axis, and means for transmitting to said treadle through said one valve element reaction forces proportional to hydraulic pressures in said master cylinder.

10. A booster brake mechanism for motor vehicles comprising a motor having a stationary wall, a rigid movable wall pivoted adjacent one end thereof for turning movement on a fixed axis toward and away from said stationary wall, and a bellows connecting said movable and stationary walls adjacent the peripheries thereof and forming with such walls a differential fluid pressure motor chamber, a master cylinder carried by said stationary wall and having an outlet for connection with the vehicle brakes, a plunger in said cylinder, a valve mechanism comprising a sleeve and a spool valve therein arranged substantially in axial alignment with said plunger, said sleeve being supported by said movable wall and having mechanical connection with said plunger to transmit movement thereto upon movement of said movable wall, said spool valve having a normal position relative to said sleeve connecting said motor chamber to the atmosphere and relatively movable from such position to connect said chamber to a source of sub-atmospheric pressure, manual means comprising a treadle for moving said spool valve away from its normal position relative to said sleeve, a piston in said plunger open to said master cylinder, and means for establishing mechanical connection between said spool valve and said piston to transmit hydraulic reactions against said piston to said manual means.

11. Apparatus constructed in accordance with claim 10, wherein said treadle is mounted to turn on said axis and being arranged adjacent said movable wall and having lost motion connection therewith.

12. A booster brake mechanism for motor vehicles comprising a motor having a stationary wall, a rigid movable wall mounted for turning movement on a fixed axis and a bellows connecting the peripheral portions of said walls and forming therewith a differential fluid pressure motor chamber, a master cylinder carried by said stationary wall, a piston in said master cylinder mechanically connected to said movable wall, a valve mechanism for controlling differential pressures in said chamber and comprising relatively movable elements one of which is fixed with respect to said movable wall and the other of which is movable relative to said one element, said valve elements normally occupying relative positions connecting said motor chamber to the atmosphere and being relatively movable to connect said chamber to a source of sub-atmospheric pressure, manual means comprising a treadle for operating said other valve element, a pressure responsive unit comprising a chamber and a pressure movable element therein operable under increases in pressure in such chamber to oppose movement of said other valve element away from its normal position, and a duct connecting said master cylinder to the chamber of said pressure responsive unit.

13. Apparatus constructed in accordance with claim 12, wherein said valve mechanism is arranged in said motor chamber eccentric to the axis of said master cylinder, said means for moving said other valve element comprising a treadle arranged adjacent said movable wall and having mechanical engagement with said other valve element.

14. A booster brake mechanism for motor vehicles comprising a motor having a stationary wall, a movable wall mounted for turning movement toward said stationary wall on an axis adjacent one edge of said movable wall, and a bellows connecting said walls and forming therewith a differential fluid pressure motor chamber, a master cylinder carried by said stationary wall, a piston in said master cylinder, a valve mechanism arranged in said motor chamber and comprising a pair of elements one of which is fixed with respect to said movable wall and the other of which is movable relatively to said one valve element, said valve elements having a normal position in which said chamber is connected to a source of sub-atmospheric pressure, manual means for moving said other valve element away from its normal position to connect said chamber to a source of pressure differential to effect movement of said movable wall away from a predetermined normal position, and common lever means for transmitting to said piston movements of said movable wall and said other valve element and for transmitting to said other valve element reaction forces proportional to hydraulic pressures in said master cylinder.

15. Apparatus constructed in accordance with claim 14, wherein the means for moving said other valve element comprises a treadle arranged adjacent said movable wall and mounted to turn on said axis, said common lever means comprising a lever having mechanical connections at spaced points with said movable wall, said piston, and said other valve.

16. A booster brake mechanism for motor vehicles comprising a master cylinder adapted for connection with the vehicle brakes, a piston in said master cylinder, a differential fluid pressure operated motor having a stationary wall, a rigid pressure movable wall mounted for turning movement on a fixed pivot axis and mechanically connected to said piston, and a flexible casing connected between said walls, a valve mechanism for said motor carried by said movable wall within the motor and offset from the connection between said movable wall and said piston, a treadle for operating said valve mechanism, and a pair of separate pressure responsive devices responsive to differential pressures affecting said motor for successively resisting movement of said manual means in accordance with increasing differential pressures affecting said motor.

17. A booster brake mechanism for motor vehicles comprising a master cylinder adapted for connection with the vehicle brakes, a piston in said master cylinder, a differential fluid pressure operated motor having a stationary wall fixed with respect to said master cylinder, a rigid pressure movable wall mounted for turning movement or a fixed pivot axis, a flexible casing connected between said walls and defining therewith a motor chamber, a mechanical connection in said motor chamber between said movable wall and said piston, a follow-up control valve mechanism comprising housing means, carried by said movable wall, and a valve therein having a normal position in which said motor is de-energized, a treadle for moving said valve away from said normal position to energize said motor in a follow-up operation relative to movement of said treadle, a first pressure responsive device subject to differential pressures affecting said movable wall for resisting movement of said manual means in a direction to energize said motor, and a second pressure responsive device operable at higher differential pressures affecting said movable wall for resisting said movement of said manual means in accordance with differential pressures affecting said movable wall.

18. Apparatus constructed in accordance with claim 17 wherein said treadle is mounted to turn on said axis.

19. A booster brake mechanism for motor vehicles comprising a master cylinder adapted for connection with the vehicle brakes, a piston in said cylinder, a differential fluid pressure motor having a stationary wall fixed with respect to said master cylinder, a rigid pressure movable wall mounted for turning movement on a fixed axis, a flexible casing connected between said walls and forming therewith a motor chamber, a mechanical connection between said movable wall and said piston for transmitting movement from the former to the latter, a follow-up control valve mechanism for said motor comprising housing means in said motor chamber carried by said movable wall and a valve in said housing means, a diaphragm in said housing means forming therewith an atmospheric chamber, and a variable pressure chamber in fixed communication with said motor chamber, said valve having a normal position connecting said variable pressure chamber with the atmosphere and movable from said normal position for connecting said variable pressure chamber to a source of vacuum, said diaphragm having a portion engageable with said valve to apply thereagainst a reaction proportionate to differential pressures affecting said motor when said valve is moved from said normal position, a second diaphragm in said housing means forming therewith an atmospheric chamber, and a variable pressure chamber in fixed communication with said motor chamber whereby said second diaphragm is subject to differential pressures in said motor and has means engageable with said portion of said first diaphragm to assist the latter in resisting movement of said valve from said normal position, resilient means resisting movement of said second diaphragm, and a treadle for applying a force to said valve to move it from said normal position.

20. Apparatus constructed in accordance with claim 19 wherein said treadle is mounted to turn on said fixed axis and normally spaced from said movable wall whereby it is movable relative thereto to effect movement of said valve from said normal position.

21. A booster brake mechanism for motor vehicles comprising a master cylinder having an outlet for connection with the vehicle brakes, a piston in said master cylinder, a differential fluid pressure motor having a stationary wall fixed with respect to said master cylinder, a rigid movable pressure wall mounted for turning movement on a fixed axis and having mechanical connection with said piston, a flexible casing connected between said walls, a valve mechanism for controlling differential pressures in said motor, and manual means for operating said valve mechanism.

22. A booster brake mechanism for motor vehicles comprising a master cylinder having an outlet for connection with the vehicle brakes, a piston in said master cylinder, a differential fluid pressure motor having a stationary wall fixed with respect to said master cylinder, a rigid movable pressure wall mounted for turning movement on a fixed axis and having mechanical connection with said piston, a flexible casing connected between said walls, a valve mechanism for controlling differential pressures in said motor, said valve mechanism comprising a pair of relatively movable elements one of which is carried by said movable pressure wall and the other of which is movable from a normal position relative to said one element for energizing said motor, manual means for operating said other valve element, and means mechanically engaging said other valve element and operable as a result of energization of said motor for opposing movement of said other valve element away from its normal position.

23. A booster brake mechanism for motor vehicles comprising a motor having a stationary wall, a movable wall mounted for turning movement on a fixed axis toward said stationary wall, and a bellows connecting said walls and forming therewith a differential fluid pressure motor chamber, a master cylinder fixed with respect to said stationary wall, a piston in said master cylinder, a valve mechanism comprising a pair of elements one of which is fixed to said movable wall and the other of which is movable from a normal off position relative to said one valve element to energize said motor, manual means for moving said other valve element away from its normal position to energize said motor, a lever in said motor chamber pivoted for turning movement on an axis fixed with respect to said movable wall, and motion transmitting means between said piston and said lever pivoted to the latter at a point spaced from said last-named pivot axis, said lever at a point spaced substantially from both said last-named pivot axis and said motion transmitting means having mechanical engagement with said other valve element.

24. Apparatus constructed in accordance with claim 23 wherein said manual means comprises a treadle having limited movement from a normal position toward said movable wall and mounted for turning movement on said first-named axis.

References Cited in the file of this patent

UNITED STATES PATENTS

| | | |
|---|---|---|
| 2,207,700 | Porter | July 16, 1940 |
| 2,445,862 | Price | July 27, 1948 |
| 2,685,172 | Price | Aug. 3, 1954 |
| 2,731,797 | Ayers | Jan. 24, 1956 |